Sept. 29, 1970  R. C. WELLS  3,531,791
REMOTE INDICATING DEVICE
Filed June 10, 1968
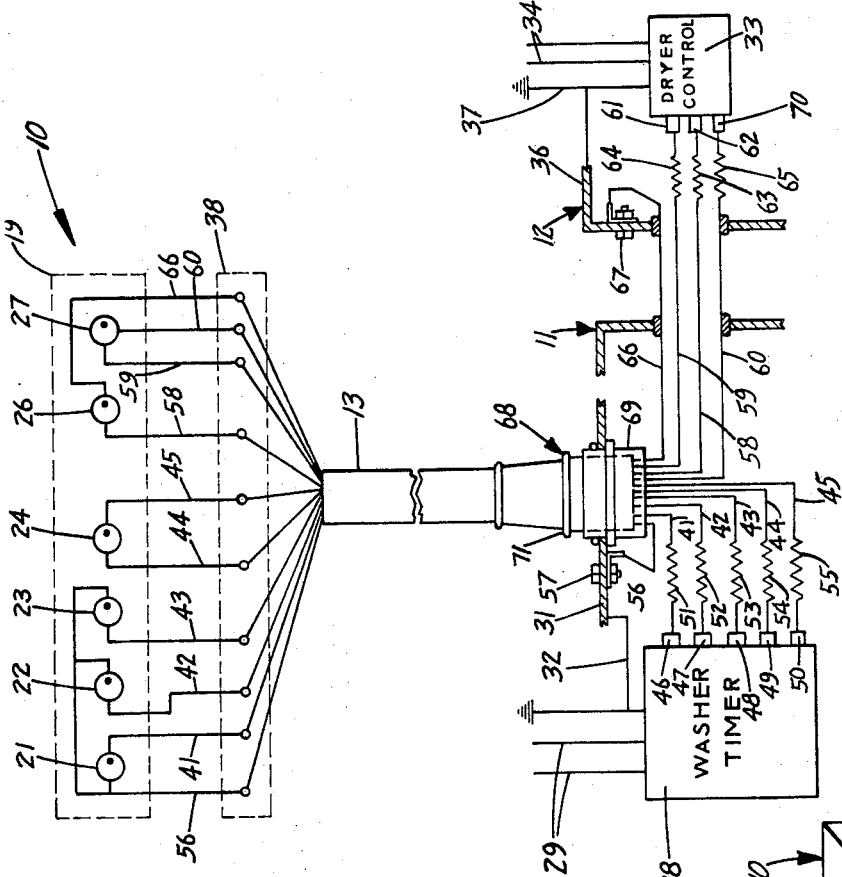
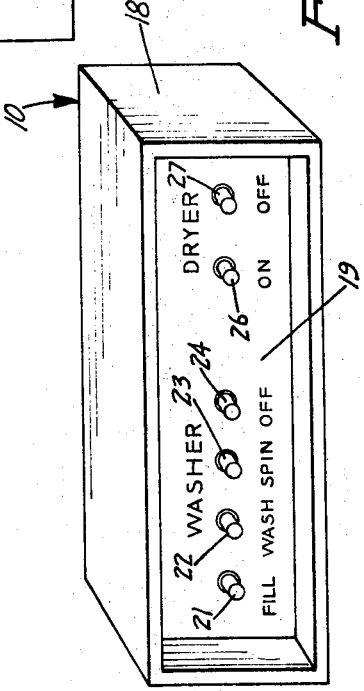
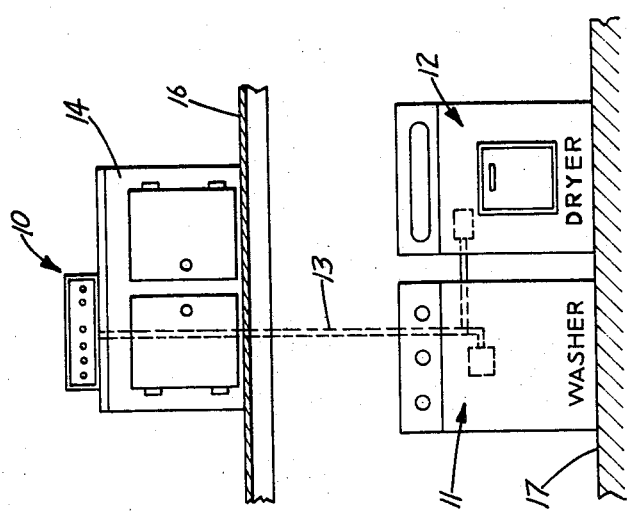
INVENTOR.
RICHARD C. WELLS
BY
Burd, MacEachron, Braddock,
Bartz & Schwartz
ATTORNEYS 0# United States Patent Office 3,531,791
Patented Sept. 29, 1970

3,531,791
REMOTE INDICATING DEVICE
Richard C. Wells, 8457 Sunset Road,
Minneapolis, Minn. 55432
Filed June 10, 1968, Ser. No. 735,865
Int. Cl. G08b 21/00
U.S. Cl. 340—255                                  9 Claims

ABSTRACT OF THE DISCLOSURE

A remotely located indicator connected to the timer of a washer and electric control of a dryer provide a visual light indication of the cycle of operation of the washer and the ON or OFF conditions of the washer and dryer. Current limiting resistors located in the power lines to all the lamps of the indicator provide the indicator with low safe power. The lamps of the indicator are separately grounded to the washer and dryer so that the washer lamps will only operate when the washer is correctly grounded and the dryer lamps will only operate when the dryer is correctly grounded.

BACKGROUND OF INVENTION

Present day washers and dryers are not provided with remote located indicators which provide information as to the cycle of operation or the ON–OFF conditions of the machines. Some washers are equipped with safety buzzers which are turned on when the washer basket is locked in the spin cycle. The buzzer does not operate to provide remote information of all the cycles of operation of the washer. Knowledge of the operation of the dryer is important in drying wash-and-wear fabrics. These fabrics should be removed from the dryer as soon as the dryer has turned off to prevent wrinkling of the fabrics. To safely connect the washer and dryer to the electrical power source, it is necessary that each machine be properly grounded. Recent electric codes have been enacted to ensure properly grounded washers and dryers. The object of the invention is to provide a remote control indicating device which provides information to the cycle of operation of the washer and the ON–OFF conditions of the washer and dryer which will operate only when both the washer and dryer are properly grounded.

SUMMARY OF INVENTION

The invention broadly relates to an indicating apparatus for providing information to the operational conditions or cycles of a machine. The apparatus is spaced from the machine to provide the information at a remote station. The indicator apparatus has separate indicator lamps for each cycle of the machine and indicator lamps showing if the machine is turned off. The lamps are connected to the machine so that the indicator lamps separately sense operational conditions or cycles of the machine. The electrical circuits for the lamps are completed through the machine so that the machine must be properly grounded before the apparatus is operational. The apparatus has electrical safety by the use of current limiting electrical elements, as resistors, diodes and the like, in the circuits to the lamps.

IN THE DRAWINGS

FIG. 1 is a schematic view showing the indicator of the invention located in an upper room and connected to a washer and dryer located in the basement;

FIG. 2 is an enlarged perspective view of the indicator shown in FIG. 1; and

FIG. 3 is an electrical diagram of the indicator apparatus of FIG. 1 and the line connecting the apparatus to the washer and dryer.

Referring to the drawing there is shown in FIG. 1 an indicator apparatus indicated generally at 10 connected to a washer 11 and dryer 12 by an electrical cable 13. The indicator 10 is supported on a cabinet shelf 14 standing on a floor 16. Indicator 10 may be attached to a wall support or mounted directly in the wall of the structure. Preferable, indicator 10 is located in the kitchen of a house where it is readily observed by the housewife and/or maid. The washer 11 and dryer 12 are located in the basement 17 or other area remote from the indicator 10.

In use, the indicator 10 provides information as to the operating cycle of the washer 11 and whether or not the washer and dryer are either ON or OFF. This remote information saves considerable time and work for the housewife. The dryer remote information is important in the drying of wash-and-wear fabrics as these fabrics must be removed from the dryer as soon as the drying cycle has terminated in order to minimize the wrinkling and undesirable creases.

Referring to FIG. 2, there is shown indicator 10 having a rectangular box-shaped housing 18. Recessed across the front of the housing 18 is an upright panel 19 carrying a plurality of information indicating means which sense the operating cycles of the washer and the ON and OFF conditions of the washer and dryer. The indicating means comprise washer lamps or lights 21, 22, 23 and 24 and the dryer ON and OFF lamps or lights 26 and 27. As indicated on the face of panel 19, lamp 21 is the fill lamp, lamp 22 is the wash lamp, lamp 23 is the spin lamp and lamp 24 is the OFF lamp. These lamps are selectively ON to indicate the cycle of the washer and whether the washer is ON or OFF. On reversible motor washers both the wash lamp and spin lamp will be changed to ON lamps. In a similar manner, lamps 26 and 27 of the dryer indicate the ON and OFF condition of the dryer. Preferable, the lamps 21–24 and 26 and 27 are neon lamps which require a minimum of power providing for the electrical safety of the indicator. To provide for a visual difference between the operating or ON and OFF conditions of the machines, the washer lamps 21, 22 and 23 and dryer lamp 26 are red and the wash OFF lamp 24 and dryer OFF lamp 27 are amber. Other colored lamps or clear lamps can be used to provide visual indications of the operating conditions of the washer and dryer.

Referring to FIG. 3, there is shown the electrical circuit diagram for the apparatus 10 connected to the washer 11 and dryer 12 with electric cable 13. The washer 11 has the conventional automatic timer 28 connected to the electric power source through lines 29. The housing 31 of the washer is connected to the ground line 32.

The dryer 12 has a conventional electrical dryer control 33 connected to the electric power source with line 34. The dryer is enclosed in housing 36 connected to ground line 37. The dryer 12 may be an electric or gas dryer with the control 33 functioning as a switch for the drive motor of the dryer.

The indicator 10 has an elongated terminal block 38 indicated in broken lines for connecting the lines of the cable to the lamps. Power lines 41, 42, 43 and 44 are connected to the lamps 21, 22, 23 and 24 respectively. These lines extend through the covering of cable 13 and into the washer 11. Timer terminals 46, 47, 48 and 49 are connected to the lines 41, 42, 43, 44 respectively, whereby the timer selectively couples the indicator lamps to a source of electrical power. Interposed in the lines 41-44 are the current limiting devices, 51, 52, 53 and 54, as resistors, diodes and the like, which reduce the voltage and amperage supplied to the lamps. This reduced voltage is insufficient to cause even mild shock, yet provides enough power to light the lamps. All of the lamps 21-23 are connected to a common or ground line 56. A fastener 57 connects the ground lines 56 to washer housing 33 grounding the indicator 10 to the washer 11. In this manner, the washer 11 must be properly grounded before the circuits for the indicator lamps are completed. A ground line 45 connects the OFF lamp 24 to timer terminal 50. A current limiting electrical element 55, as a resistor, diode or the like, is interposed in line 45 within washer housing 31. Lamp 24 is connected in parallel with the OFF timer switch so that the lamp 24 will be OFF when the switch is closed and ON when the switch is open.

The dryer lamps 26 and 27 are connected with power lines 58 and 59 to terminals 61 and 62 forming part of the dryer control 33. Resistors 63 and 64 interposed in the lines 58 and 59 respectively, limit the power supply to the dryer lamps 26 and 27. A common or ground line 66 couples lamp 26 to the dryer housing 36 through a fastener 67. In this manner, the electrical circuit for the lamp 26 is completed through the dryer housing 36. A ground line 60 connects lamp 27 to dryer control terminal 70. A current limiting resistor or similar device 65 is interposed in line 60 within dryer housing 36. Lamp 27 is connected in parallel with the OFF switch of dryer control 33 so that lamp 27 will be OFF when the switch is closed and ON when the switch is open. The use of the washer housing 31 and dryer housing 36 as part of the ground line, is a safety feature which eliminates incorrect electrical connection of the washer and dryer.

The resistors 51-55 are located within the washer housing 31 so that only the minimum power is utilized outside of the washer to create an electrical shock outside of the washer housing. The resistors 63, 64 and 65 for the dryer lines 58, 59 and 60 are located within the dryer housing 36 so that only the minimum power is carried outside of the dryer.

A releasable connector indicated generally at 68 is used to connect the cable 13 to the washer. Connector 68 has a female socket 69 mounted on the housing 31. The end of cable 13 has a cooperating male plug 71 which is connectable to the female socket 69 to form an electrical connection for the lines connecting the washer timer 28 and dryer control 33 to the lamps of indicator 10. A separate connector can be used to connect the cable 13 to the dryer thereby avoiding the necessity of carrying the dryer lines 58, 59 and 66 into the washer housing 31.

A connector similar to connector 68 can be used to connect the upper end of cable 13 to lines leading to the terminal block 38. Other designs of cable assemblies can be utilized to electrically couple the washer and dryer to the indicator 10.

As an example of the electrical installation of the indicator 10, the lamps 21-24 and 26 and 27 are inert gas or neon lights which will operate on small amounts of power. The resistors 51, 52, 53 and 63 are 100 K. resistors while the OFF resistors 54, 55 and 64, 65 are 39 K. These resistors reduce the normal 115 v., 5 amp. power to approximately 65 volts and 40 microamps.

In use, the washer lamps 21-24 will operate in response to the washer timer 28. Lamp 21 will be ON during the fill cycle. Lamp 22 will be ON during the wash cycle. Lamp 23 will be ON during the spin cycle. When the washer is OFF lamp 24 will stay ON. In a similar manner when the dryer is ON, lamp 26 will be ON and when the dryer is OFF, lamp 27 will be ON. There will always be a light on for the washer and dryer to indicate the operating or non-operating conditions of the washer and dryer.

While the invention has been described with respect to a preferred embodiment of the remote indicating apparatus and the electrical circuit connecting the apparatus to a washer and dryer, it is to be understood that various changes in the uses may be made by those skilled in the art without departing from the sipirit of the invention. For example, the indicator 10 may be used with machines other than a washer and dryer to indicate the operating operational conditions of the machine at a remote station.

The embodiments of the invention in which an exclusive property or privilege is claimed are defined as follows:

1. An apparatus for indicating the operational cycles of a washer and dryer comprising: indicator means remotely spaced from the washer and dryer for providing separate information of each operational cycle of the washer and dryer, means connecting the indicator means with the washer and dryer whereby the indicator means will separately sense the operational cycles of the washer and dryer and provide information of the sensed operational cycles, said washer having a housing and a timer located within the housing to control the cycles of the washer, said indicator means having lamp means for each cycle of the washer and a lamp means indicating the "Off" condition of the washer, said means connecting the indicator with the washer comprising first line means electrically coupling each lamp means with the timer, power limiting means in each of said first line means located within the washer housing to limit the power supply to the lamp means, ground line means connecting the lamp means with the washer, whereby the indicator means will only operate when the washer is properly grounded, said dryer including a housing and an electric control located within the dryer housing, said indicator means having an "On" lamp means and an "Off" lamp means, second line means connecting the "On" and "Off" lamp means to the electric control, whereby the "On" lamp means will be lit when the dryer is operating and the "Off" lamp means will be lit when the dryer is not operating, power limiting means in said second line means located within the dryer housing to limit the power supply to the "On" lamp means and the "Off" lamp means, ground line means connecting the "On" and "Off" lamp means to the dryer, whereby said "On" and "Off" lamp means will only operate when the dryer is properly grounded.

2. The apparatus of claim 1 wherein the lamp means are neon lights.

3. The apparatus of claim 1 wherein the power limiting means are resistors located within the washer housing and dryer housing.

4. The apparatus of claim 1 including a releasable electric connector means mounted on the washer for releasably coupling the first line means and ground line means to the washer.

5. The apparatus of claim 1 wherein: the second line means extends from the dryer housing and into the washer housing, a releasable connector means mounted on the washer housing coupled to the first line means and the second line means, whereby portions of the first line means and second line means outside of the washer housing can be disconnected from the washer housing.

6. The combination: a washer having a housing and timer located within the housing to control the cycles of the washer, indicator means remotely spaced from the washer to provide information of each operational cycle of the washer, said indicator means having separate first lamp means for each cycle of the washer and second lamp means indicating the "Off" condition of the washer, line means electrically coupling the first and second lamp means with the timer, power limiting means in each of said line means located within the washer housing to limit the power supplied to the first and second lamp means, and ground line means connecting the first and second lamp means with the washer, whereby the indicator means will only operate when the washer is properly grounded.

7. The combination of claim 6 wherein: the lamp means are inert gas lights.

8. The combination of claim 6 wherein: the power limiting means are resistors located within the washer housing.

9. The combination of claim 6 including: a releasable electrical connector mounted on the washer housing for releasably coupling the line means and the ground line to the washer housing, whereby portions of the line means and ground line means outside of the washer housing can be disconnected from the washer housing.

References Cited

UNITED STATES PATENTS

| | | | |
|---|---|---|---|
| 2,642,565 | 6/1953 | Grimson et al. | 340—282 |
| 3,222,663 | 12/1965 | Dennis | 340—255 |
| 3,305,772 | 2/1967 | Earnhart | 340—252 |
| 3,334,340 | 8/1967 | McConnell | 340—310 |
| 3,441,929 | 4/1969 | Coffer et al. | 340—216 |

ALVIN H. WARING, Primary Examiner

D. MYER, Assistant Examiner

U.S. Cl. X.R.

68—12; 340—256